Dec. 24, 1963 T. P. FARKAS 3,115,006
AFTERBURNER FUEL CONTROL
Filed April 21, 1958
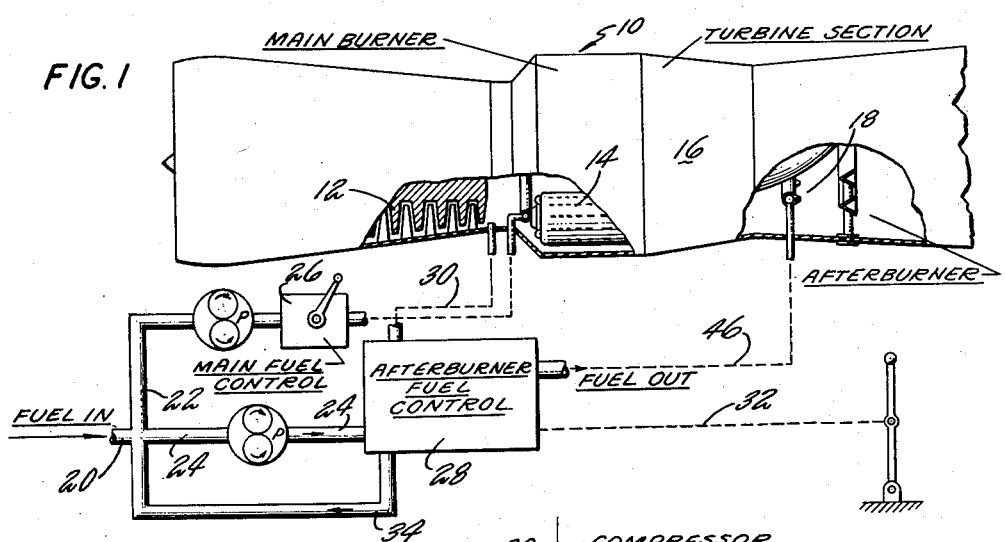
FIG. 1
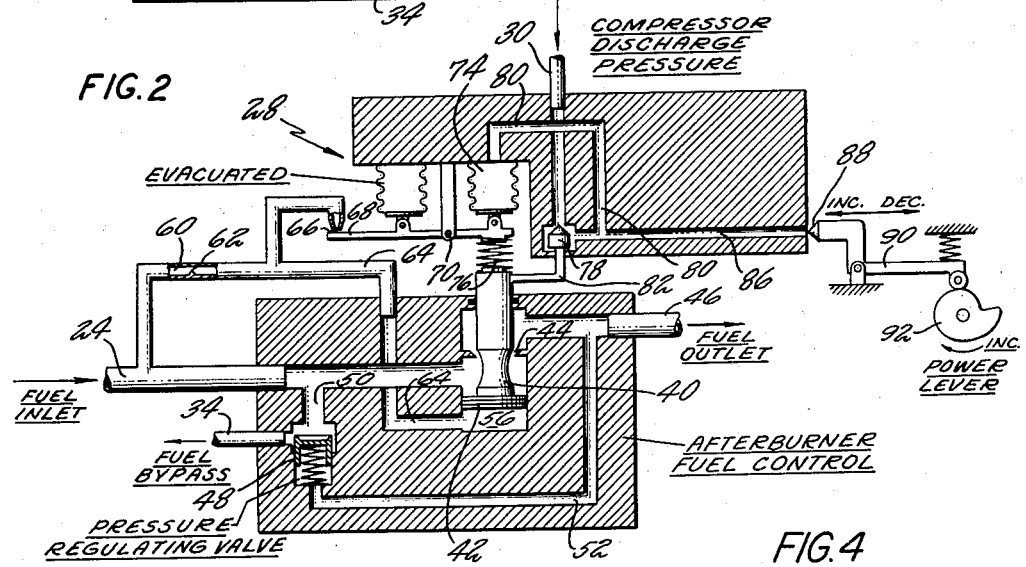
FIG. 2
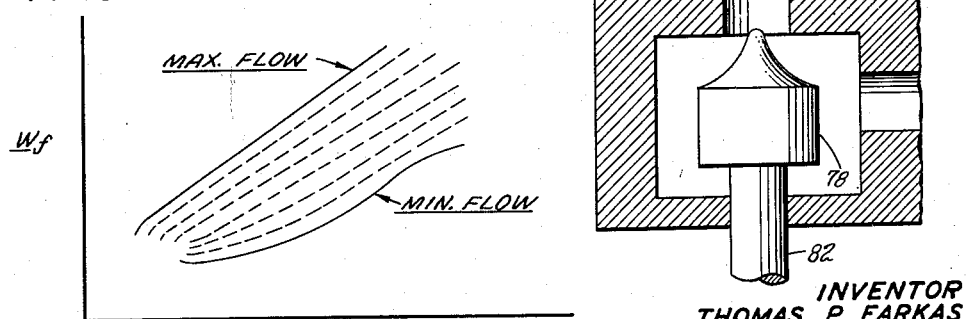
FIG. 3
FIG. 4
INVENTOR
THOMAS P. FARKAS
BY Leonard F. Weikind
ATTORNEY

3,115,006
AFTERBURNER FUEL CONTROL
Thomas P. Farkas, Bloomfield, Conn., assignor to United Aircraft Corporation, East Hartford, Conn., a corporation of Delaware
Filed Apr. 21, 1958, Ser. No. 729,710
7 Claims. (Cl. 60—35.6)

This invention relates to fuel controls for turbine type power plants and more particularly to fuel controls for afterburners of such power plants.

It is an object of this invention to provide an afterburner fuel control which establishes a maximum fuel flow line (fuel flow versus compressor discharge pressure curve) and a minimum fuel flow line, each having a particular curvature. The fuel control further provides a number of intermediate fuel flow lines (curves) which are similar to the maximum fuel flow line when operation is near that region and lines which are similar to the minimum fuel flow line when operation is near the latter region.

These and other objects of this invention will become readily apparent from the following detailed description of the drawing in which:

FIG. 1 is a partial cross section and a partial schematic illustration of a turbine type power plant having a main fuel control and an afterburner fuel control;

FIG. 2 is a schematic illustration of the afterburner fuel control of this invention;

FIG. 3 is a fuel flow versus compressor discharge pressure curve; and

FIG. 4 is a fragmentary view in cross-section showing an enlargement of valve 78.

Referring to FIG. 1, a turbine type power plant is generally indicated at 10 as having a compressor section 12, a burner section 14, a turbine section 16, and an afterburner section 18. Fuel from a suitable source is fed by the line 20 to lines 22 and 24 leading to the main fuel control 26 and afterburner fuel control 28, respectively.

The main fuel control 26 may sense suitable parameters of engine operation and control the main fuel flow accordingly. A suitable main fuel control is more clearly illustrated and described in Patent No. 2,822,666, issued February 11, 1958, to Stanley G. Best. The afterburner fuel control of this invention senses compressor discharge pressure via a line 30 and receives a power lever signal via a line 32. The afterburner control 28 includes a bypass line 34 which bypasses a certain amount of fuel in order to regulate the pressure drop across the afterburner throttle valve.

Referring to FIG. 2, the afterburner fuel control 28 is shown as receiving fuel from the main fuel inlet 24. Fuel from the line 24 passes through the afterburner main throttle valve 40 which is normally positioned by a servo piston 42. The throttle valve 40 regulates the flow of fuel across the variable orifice 44 and delivers fuel via the line 46 to the afterburner. A bypass valve 48 senses the pressure upstream of the throttle valve 40 via a line 50 and also senses the pressure downstream of the throttle valve 40 via a line 52. The bypass valve 48 maintains the pressure drop across the orifice 44 of the throttle valve at a constant value by bypassing a certain amount of fuel out through the bypass line 34. The movable element 40 of the throttle valve as stated above is positioned by a servo piston 42 which has a pressure chamber 56 located immediately therebelow.

Fuel is used as a servo fluid; and consequently, high pressure fuel is admitted by a line 60 by a fixed orifice 62. High pressure fuel from the line 60 then passes into the line 64 leading to the chamber 56. The pressure in the line 64 is bled off by means of a variable area orifice 66 whose area is varied by motion of the left-hand end of a bar 68. The bar 68 is pivoted at 70. To the left of the pivot 70 there is connected an evacuated bellows 72, while to the right of the pivot is connected a second bellows 74. The bellows 74 responds to a controlled compressor discharge pressure so as to vary the force acting on the spring 76. It will be noted that the spring 76 is opposed in motion by movement of the main throttle valve element 40 as positioned by the servo piston 42. Motion of the bar 68 about the pivot 70 controls the opening of the variable orifice 66. The position or opening of the variable orifice 66 in turn controls the pressure in the line 64 and the servo chamber 56. Thus, an equilibrium is always achieved whereby the pressure of the springs 76 balance the force provided by the pressure in the bellows 74.

The main throttle valve 40, it will be noted, has a nonlinear contour so as to provide a maximum fuel line curve in a manner to be described hereinafter.

Compressor discharge pressure is sensed via the line 30 which has positioned therein a variable area orifice or valve 78. Any compressor discharge pressure in the line 30 must flow past the valve 78 before it can flow to the line 80 which leads internally of the bellows 74. It will be noted that the variable area orifice or valve 78 is mechanically connected via a link 82 to the movable portion 40 of the afterburner throttle valve. Thus, any change in position of the throttle valve element 40 or its associated servo piston 42 will be reflected by proportional movement of the valve 78. The valve 78 is also contoured so as to provide a nonlinear response to changes in position in order to establish a minimum fuel flow line. The compressor discharge pressure in the lines 30 and 80 can be further bled from the line 86 by means of a variable area orifice or valve 88. The area of this orifice is controlled via the linkage 90 through a cam 92 which is rotatable with the power lever. Thus, it will be seen that both the variable area orifices 78 and 88 will affect the pressure in the bellows 74 which in turn eventually affects the position of the throttle valve servo 42. As mentioned above, the system described herein satisfies the requirements of an afterburner fuel control which schedules a maximum fuel flow line varying with compressor discharge pressure and a second, but differently contoured, minimum fuel flow line varying with compressor discharge pressure. These maximum and minimum flow lines of different contour are shown in FIG. 3. Various intermediate fuel flow operating lines are obtainable in between the maximum fuel flow line and the minimum fuel flow line with these intermediate lines having a shape similar to the maximum line when the operating condition is near the maximum and having a shape similar to the minimum fuel flow line when operation approaches this condition. The curve shown in FIG. 3 illustrates the desired schedule. The desired schedule is obtained with the mechanism shown in FIG. 2 in the following manner. For maximum fuel flow schedule, the valve 88 is closed off completely as a result of movement of power lever and the cam 92 and its associated linkage 90. As a result, the pressure in the bellows 74 will then always be equal to compressor discharge pressure. Thus, in this position of the valve 88 the throttle valve element 40 will be positioned proportional to the pressure existing in the bellows 74 at any instance. Inasmuch as a constant pressure drop is maintained across the throttle valve orifice 44, the desired maximum schedule is provided by the particular contour of the throttle valve movable element 40 to provide a desired area at 44 for each position of the valve element 40.

The minimum fuel flow schedule is attained by setting the valve 88 at a desired value by movement of this power lever and the cam 92 and lever 90. It should be noted here that valve 78 is provided with a nonlinear contour so that eventually this valve will affect the contour of the minimum flow line shown in FIG. 3. Thus, for example, with the area of the valve 88 at a constant, the pressure in the bellows 74 will be a function of compressor discharge pressure and the area of the contoured valve 78. In other words, for a given compressor discharge pressure the pressure in the bellows 74 will be that pressure which will set the throttle valve member 40 for a fuel flow for the maximum schedule for that particular compressor discharge pressure decreased by an amount proportional to the pressure drop across the valve 78. Thus, it is seen that by controlling the pressure drop across the valve 78 the throttle valve member 40 may be made to assume a position which will afford the desired minimum fuel flow for the then existing compressor discharge pressure.

It should be noted that a contoured valve 78 is provided in order to provide the desired minimum fuel flow schedule which varies in a manner different than that of the maximum fuel flow schedule for any given change of compressor discharge pressure. If the valve 78 were not contoured or instead provided a constant difference in opening with motion of the valve, the effect of opening and closing the valve 88 would be merely to shift the maximum fuel flow line up or down in a proportional manner. Hence, if the area of the valve 78 varied linearly with the throttle valve position (since they are connected), the effect would be merely to bend a minimum fuel flow line of the same contour as a maximum fuel flow either up or down at its tail end depending on whether the area of the valve 78 increased with increasing compressor discharge pressure or decreased with increasing compressor discharge pressure.

Thus, with the contoured valve 78, it is possible to provide any desired minimum fuel flow line so that the throttle valve 40 will assume a position which provides a certain desired fuel flow on the minimum flow line for any given compressor discharge pressure. As a result, the variation in the opening of the valve 88 between the maximum and minimum opening acts to increase or decrease the effect of the valve 78 thereby providing intermediate fuel flow lines between the maximum and minimum schedules.

FIG. 4 shows an enlargement of the contour of the valve body of valve 78 wherein it defines one configuration for obtaining a non-linear fuel flow schedule when the valve is positioned toward the seat formed at the end of line 30. The valve 78 therefore, when in the proximity of this seat begins to restrict the flow of the compressor discharge fluid medium and as valve 40 moves upwardly in a linear fashion, valve 78 functions to restrict compressor fluid in a nonlinear fashion. Of course it will be obvious to one skilled in the art that the contour may take any shape so as to define a particular or unique fuel flow schedule with each compressor discharge pressure signal. In this manner the fuel control is flexible to schedule fuel flow to satisfy the minimum fuel flow schedule for various engine requirements.

As a result of this invention it will be apparent that a very efficient and accurate afterburner fuel control has been provided which can schedule the maximum and minimum fuel flow in any desired manner. Thus, by merely selecting the proper contours of the main throttle valve movable element 40 and the valve 78, the exact curves for maximum and minimum fuel flow schedule can be obtained. Furthermore, intermediate fuel flow versus compressor discharge pressure curves are provided which tend to locate like either the maximum line or the minimum line depending on whether the operation is near either of the schedules.

Although only one embodiment of this invention has been illustrated and described herein, it will become apparent that various changes and modifications may be made in the construction and arrangement of the various parts without departing from the scope of this novel concept.

What it is desired by Letters Patent is:

1. In a turbine power plant having a compressor feeding air to a combustion chamber, a source of fuel, means for regulating the flow of fuel from said source to said combustion chamber including a main metering orifice, means for maintaining constant the pressure drop across said orifice, a movable valve element for varying the area of said orifice including a servo device having feedback means operatively connected thereto, pressure responsive means for operating said servo device, a passage including a controlling valve connected between the outlet of said compressor and said pressure responsive device for controlling the position of said servo and positioning said movable valve element in accordance with the value of the pressure at the outlet of said compressor, means connecting said controlling valve and said movable valve element for synchronous movement, and means for varying the effect of said controlling valve including valve means for varying the downstream pressure from said controlling valve, said valve means being connected in parallel with said controlling valve.

2. In a turbine power plant having a compressor, a main combustion chamber and an afterburner, a source of fuel, means for regulating the flow of fuel from said source to said afterburner including a main metering orifice, means for maintaining constant the pressure drop across said orifice, a movable valve element for varying the area of said orifice including a servo device operatively connected thereto, means responsive to the discharge pressure of said compressor for operating said servo device including a variable orifice, a feedback member operatively connected to said responsive means and said movable valve element, a passage including controlling valve connected between said compressor and said pressure responsive means for controlling said servo and positioning said movable valve element in accordance with the value of said discharge pressure, means connecting said controlling valve and said movable valve element for synchronous movement, means for varying the effect of said controlling valve including valve means for varying the downstream pressure from said controlling valve, and a manually operated control for said valve means.

3. In a turbine type power plant having a main combustion chamber and an afterburner, a compressor for feeding air to both said main combustion chamber and said afterburner, a source of fuel under pressure, means for regulating the flow of fuel from said source to said afterburner including a main throttle valve, said throttle valve including a movable flow controlling member, means for maintaining constant the pressure drop across said throttle valve, a servo motor for moving said movable member to vary the flow through said throttle valve and biasing said member in one direction, a spring biasing said member in another direction including bellows operatively connected thereto, a conduit receiving air from the discharge side of said compressor and operatively connected to said bellows for varying the output signal from said bellows, means responsive to the signal from said bellows for controlling the position of said servo motor, a controlling valve in the air path between the discharge side of said compressor and said bellows for controlling the position of said controlling member, said controlling valve being fixed to and movable with said movable member, and a variable bleed downstream of said controlling valve including a variable area orifice for varying the effect of said controlling valve on said other bellows.

4. In a turbine type power plant having a main combustion chamber and an afterburner, a compressor for feeding air to both said main combustion chamber and said afterburner, a source of fuel under pressure, means for regulating the flow of fuel from said source to said afterburner including a main throttle valve, said throttle valve including a movable flow controlling member, means for maintaining constant the pressure drop across said throttle valve, a servo motor for moving said movable member to vary the flow therethrough and biasing said member in one direction, a spring biasing said member in another direction including a bellows assembly, a conduit receiving air from the discharge side of said compressor and operatively connected to said bellows for varying the output signal from said bellows, means responsive to the signal from said bellows for controlling the position of said servo motor including a pilot valve, a controlling valve in the air path between the discharge side of said compressor and said bellows assembly for controlling the signal from said bellows assembly, said controlling valve being fixed to and movable with said movable member of said throttle valve, a variable bleed downstream of said controlling valve including a variable area orifice for varying the effect of said controlling valve on said other bellows, and manually operated means for varying the area of said orifice.

5. A fuel control for a turbine power plant having a compressor, said control comprising a main throttle valve including a contoured movable member varying the opening thereof, means for maintaining constant the pressure drop across said throttle valve, a servo device having feedback means for moving said throttle valve including a servo control mechanism, first means responsive to a variation in pressure for positioning said servo control mechanism in accordance with the value of said pressure, a passage conducting compressor discharge pressure to said first means, a pair of bleed valves connected to said passage one of said valves providing a series restriction in said passage and the other of said valves providing a bleed from said passage for varying the pressure level in said passage, and means responsive to movement of said movable valve member for simultaneously varying the opening of said one valve.

6. In a fuel control as defined in claim 5 including manual means for varying the opening of the other of said pair of valves.

7. For a turbine power plant having a compressor feeding air to a combustion chamber, a source of fuel under pressure, means for regulating the flow of fuel from said source to said combustion chamber including a throttle valve, means for maintaining the pressure drop directly across said throttle valve at a constant value, means responsive to compressor discharge pressure for producing a signal, means responsive to said signal for varying the position of the throttle valve, minimum fuel controlling means comprising valve means, said valve means being movable in response to the position of said throttle valve for modifying said signal to achieve a predetermined minimum fuel flow schedule of fuel passing through said throttle valve, pilot lever means and a bleed valve responsive to the position of said pilot lever means for further modifying said signal in such a manner as to produce a family of fuel flow schedules for a plurality of compressor discharge pressure values.

References Cited in the file of this patent

UNITED STATES PATENTS

| | | |
|---|---|---|
| 2,590,853 | Fulton | Apr. 1, 1952 |
| 2,645,240 | Drake | July 14, 1953 |
| 2,667,743 | Lee | Feb. 2, 1954 |
| 2,737,016 | Day | Mar. 6, 1956 |
| 2,742,755 | Davies et al. | Apr. 24, 1956 |
| 2,764,868 | Watson et al. | Oct. 2, 1956 |
| 2,848,869 | Russ | Aug. 26, 1958 |
| 2,849,862 | Jorgensen et al. | Sept. 2, 1958 |
| 2,858,700 | Rose | Nov. 4, 1958 |
| 2,867,082 | Colley | Jan. 6, 1959 |
| 2,916,876 | Colley et al. | Dec. 15, 1959 |
| 2,943,447 | Davies | July 5, 1960 |
| 2,966,140 | Dungan et al. | Dec. 27, 1960 |
| 2,966,141 | Corbett | Dec. 27, 1960 |
| 2,971,336 | Mock | Feb. 14, 1961 |

FOREIGN PATENTS

| | | |
|---|---|---|
| 736,003 | Great Britain | Aug. 31, 1955 |
| 745,146 | Great Britain | Feb. 22, 1956 |